C. DAVENPORT.
PERCUSSIVE ROCK DRILL.
APPLICATION FILED JULY 15, 1911.
1,054,181.
Patented Feb. 25, 1913.
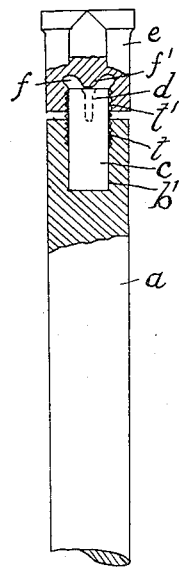
Fig. 1.
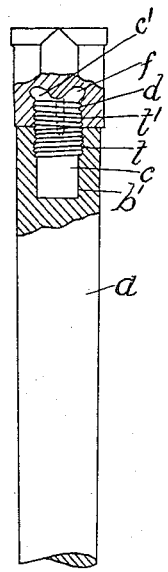
Fig. 2.
Fig. 4
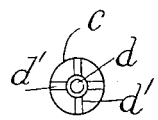
Fig. 3
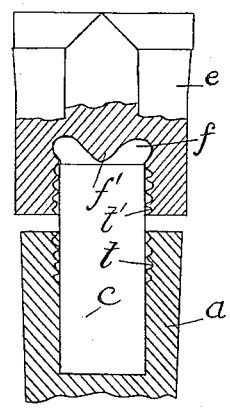
WITNESSES:
John C. Sanders
Chauncey T. Carter
INVENTOR
Carl Davenport
BY
ATTORNEY

UNITED STATES PATENT OFFICE.

CARL DAVENPORT, OF SHEFFIELD, ENGLAND, ASSIGNOR OF ONE-HALF TO RICHARD NICHOLSON, OF SHEFFIELD, ENGLAND.

PERCUSSIVE ROCK-DRILL.

1,054,181. Specification of Letters Patent. Patented Feb. 25, 1913.

Application filed July 15, 1911. Serial No. 638,620.

*To all whom it may concern:*

Be it known that I, CARL DAVENPORT, subject of England, residing at the Aztec Works, Neepsend, Sheffield, in the county of York, England, have invented new and useful Improvements in or Relating to Percussive Rock-Drills and the Like, of which the following is a specification.

My invention relates to improvements in drills and boring tools of the percussion type, such as are largely used in mining operations, and the object of my invention is to construct such drills and boring tools, (hereinafter referred to as drills), in such a manner that the bit or cutting portion can be attached to and firmly secured to a holder or drill bar and can be removed therefrom when it becomes necessary to sharpen it or substitute another bit.

I carry out my invention in the following manner the nature of which will be better understood on reference to the accompanying sheet of drawings in which, Figure 1, is a sectional elevation of a cutter bar, cutter and rivet pin before the parts have been secured together, Fig. 2, is a corresponding view after the parts have been secured together. Fig. 3, is an enlarged sectional elevation of the rivet pin inside the screwed holes before it has been subjected to pressure as shown in the smaller scale Fig. 1. Fig. 4 is a plan of the top end of the rivet pin showing the central hole and radial cuts.

The same letters refer to similar parts throughout the several views.

In the cutter end of the drill bar, $a$, which has been previously set up or enlarged, I bore or otherwise form a parallel hole or recess, $b^1$, concentric and in line with the axis of the bar, and for a short distance from the opening I form internal helical corrugations or screw threads, $t$. The threads being rounded both at their periphery and root and not V shaped like a Whitworth thread, the threads so formed being by preference right handed as shown in Figs. 1, 2 and 3. Into this partly threaded hole I accurately fit a parallel pin or rivet $c$, of dead soft steel or other suitable metal, clear of the threads, and which beds truly at the bottom of the hole; a small hole, $d$, being drilled down its center and slightly countersunk. The outer end of this pin or rivet, $c$, when driven or forced into position projects a short distance beyond the end of the drill bar as shown in Fig. 1.

The bit or cutter, $e$, which is made of hard steel and which may be cruciform or chisel shaped or of other desired form, has a recess, $f$, bored or otherwise formed in its back, such recess being slightly undercut and provided with a coned projection, $f^1$, in its center. The outer end of this recess is also provided with internal helical corrugations or screw threads, $t^1$, of a similar pitch and formation to the threads already described for the end of the drill bar, but in this case the threads are made left handed. Into this partly threaded hole in the bit or cutter $e$, the end of the parallel pin or rivet, $c$, which projects from the end of the drill bar, $a$, is now forced or driven clear of the threads, so that the tapered projection, $f^1$, at the bottom of the hole comes in line with the small hole, $d$, in the center of the pin or rivet. In this position the back of the bit or cutter, $e$, is some distance apart from the end of the drill bar by reason of the pin or rivet, $c$, being a little longer than the distance between the bottom of the hole, $b$, in the drill bar and the end of the coned projection, $f^1$, in the bit or cutter when the two parts are closed together. When the two parts are hammered or otherwise forced into position, the end of the rivet pin, $c$, is forced or splayed, by the action of the central projection, until it partly or completely fills up the recess, $f$, around the cone in the bit or cutter and by reason of the same being undercut, an internal head, $c^1$, is formed on the end of the rivet pin by which it is firmly secured into the bit. At the same time or during the same operation of forcing the rivet pin into the recess in the bit, the material of which it is formed, by reason of its extra length and its soft and ductile nature, is forced or intruded into the threads, $t^1$, and $t$, which have been formed in the hole in the bit, $e$, and in the hole in the drill bar, $b$, thereby forming right and left handed threads on the rivet pin, $c$, before the surfaces of the bit and the drill bar abut upon each other. By this form of construction and by reason of the right and left handed screws, $t$, $t^1$, herein described the bit, $e$, may be screwed off the rivet pin $c$, so as to exercise sufficient force to draw the head $c^1$, of the rivet pin out of the hole in the bit when it is desired to exchange the bit for another one or when it is only desired to sharpen the bit. By turning the bit, e, in the opposite direction the rivet pin, c, may be unscrewed out of the drill bar, a, with the bit e, attached to it.

In some cases the threads in the drill bar may be made left handed and the threads in the cutter bit made right handed.

Having now particularly described and ascertained the nature of my said invention and in what manner the same is to be performed, I declare that what I claim is.

In percussive rock drills, a drill bar having its cutter end provided with a recess having internal right handed screw threads, said threads being rounded both at their periphery and at their root, a cutter with a recess formed in the back, said recess being slightly undercut and provided with a coned projection in its center, the outer end of said recess having left-handed screw threads of similar pitch and formation to those formed in the end of the drill bar, and a pin of soft material fitted in said recesses, also in said right and left handed screw threads, and in the said undercut portion formed in the recess in the back of the cutter whereby the parts are held together.

In testimony whereof I have signed my name to this specification in the presence of two subscribing witnesses.

CARL DAVENPORT.

Witnesses:
R. HEBER RADFORD,
W. H. BAIRSTO.